(12) United States Patent
Himmel et al.

(10) Patent No.: US 6,937,868 B2
(45) Date of Patent: Aug. 30, 2005

(54) APPARATUS AND METHOD FOR MANAGING A MOBILE PHONE ANSWERING MODE AND OUTGOING MESSAGE BASED ON A LOCATION OF THE MOBILE PHONE

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/047,002

(22) Filed: Jan. 16, 2002

(65) Prior Publication Data

US 2003/0134626 A1 Jul. 17, 2003

(51) Int. Cl.[7] .................................. H04M 8/16
(52) U.S. Cl. ................ 455/456.4; 455/456.5; 455/456.6; 455/412.2; 455/412.1
(58) Field of Search ................ 455/456.5, 456.6, 455/456.1, 456.4, 412.1, 412.2, 413, 456.3

(56) References Cited

U.S. PATENT DOCUMENTS

| | | | |
|---|---|---|---|
| 5,778,304 A | * 7/1998 | Grube et al. ............. | 455/456.4 |
| 6,011,973 A | 1/2000 | Valentine et al. .......... | 455/456 |
| 6,222,458 B1 | 4/2001 | Harris ..................... | 340/686.6 |
| 6,301,338 B1 | * 10/2001 | Makela et al. ........... | 379/88.21 |
| 6,496,703 B1 | * 12/2002 | da Silva .................. | 455/456.4 |

FOREIGN PATENT DOCUMENTS

| | | | |
|---|---|---|---|
| JP | 2000113390 A | 4/2000 | ............ G08G/1/13 |
| WO | WO 00/41428 | 7/2000 | ............ H04Q/7/38 |

OTHER PUBLICATIONS

IBM Research Disclosure, Haney, L., "Mobile Telephone with Position Reporting System", vol. 41, No. 410, Jun. 1998, 410130.

* cited by examiner

*Primary Examiner*—William Trost
*Assistant Examiner*—Danh C Le
(74) *Attorney, Agent, or Firm*—Duke W. Yee; Mark S. Walker; Stephen J. Walder, Jr.

(57) ABSTRACT

An apparatus and method for managing a mobile phone answering mode and outgoing message or other indicator based on a location of the mobile phone are provided. The apparatus and method make use of a location system to ascertain the current location of a mobile telephone being carried by a user. Based on the current location, the apparatus and method determine whether operation of the mobile telephone to receive and/or send calls should be restricted. In addition, the apparatus and method determine an appropriate outgoing message to be provided to calling parties while the mobile telephone is located in an area where use of the mobile telephone to receive calls is prohibited. The particular outgoing message provided is customized to the current location of the mobile telephone and optionally, the caller ID of the calling party.

42 Claims, 3 Drawing Sheets

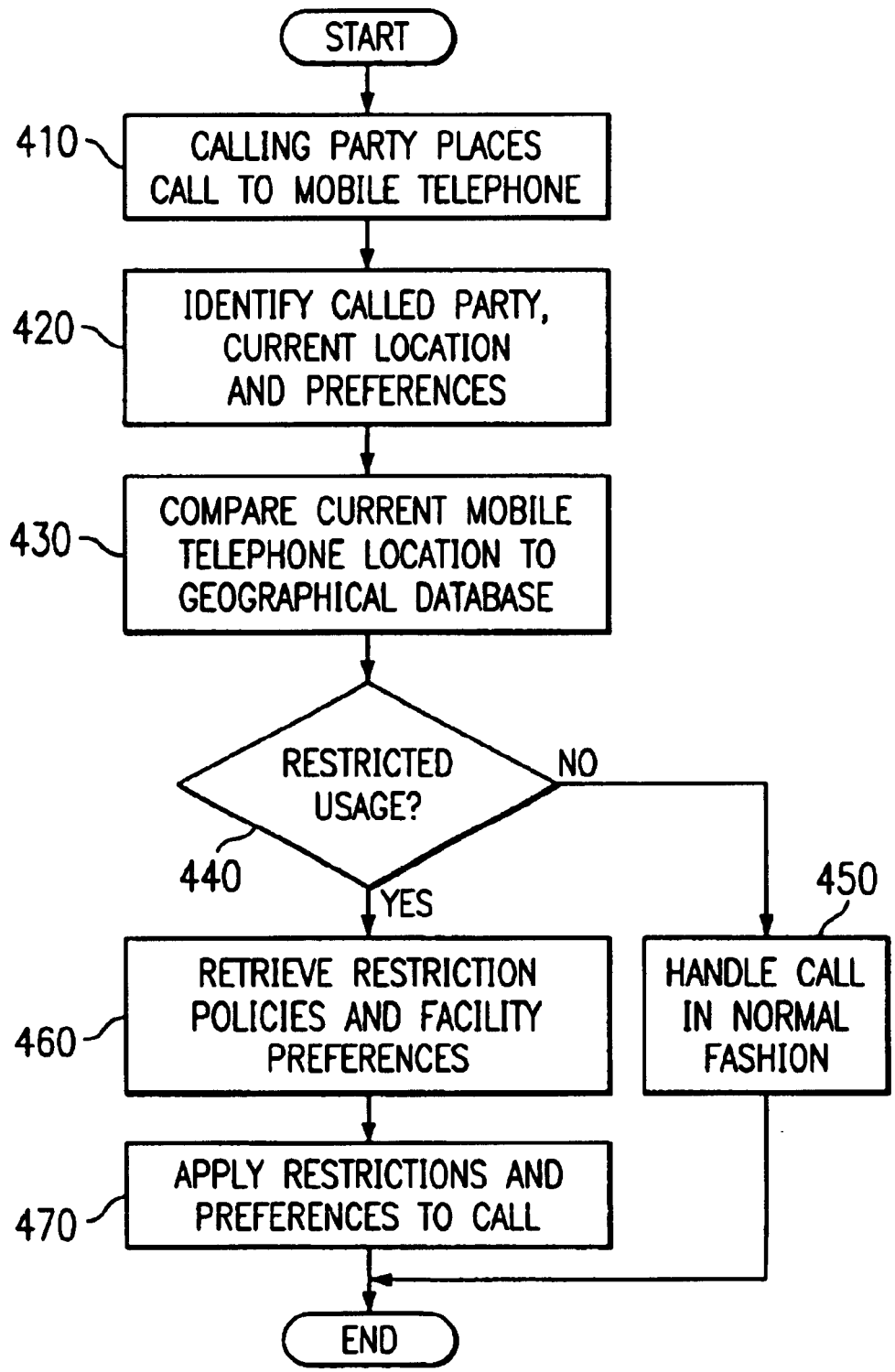

APPARATUS AND METHOD FOR MANAGING A MOBILE PHONE ANSWERING MODE AND OUTGOING MESSAGE BASED ON A LOCATION OF THE MOBILE PHONE

BACKGROUND OF THE INVENTION

1. Technical Field

The present invention is directed to an improved data processing system. More specifically, the present invention is directed to an apparatus and method for managing a mobile phone answering mode and outgoing message based on a location of the mobile phone.

2. Description of Related Art

While traveling with a mobile phone, a phone user frequently gets calls at inconvenient locations/times. Often this inconvenience is caused by being at a location where use of the phone is not allowed, e.g., a movie theatre, a play house, an opera house). This results in the requirement that the phone user manually turns off his phone or his phone ringer, and cannot take calls at that time.

In addition, with the current implementation of mobile phone messaging, the caller usually receives a preset outgoing message which the phone user has previously set up as the announcement for not being able to answer the call. This phone message is a typically a general message that does not give any specific details as to why the user is unable to answer the call. Customizing of this message by the phone user is possible, but requires extra, and often inconvenient, effort.

Thus, it would be beneficial to have an apparatus and method by which a mobile telephone may be automatically disabled when the user carries the mobile telephone to a location where use of the mobile telephone is inappropriate or prohibited. In addition, it would be beneficial to have an apparatus and method by which an outgoing message is customized based on the user's current location to thereby inform the caller why the user is unable to answer the call. In addition, it would be beneficial to inform the caller of the whereabouts of the called party based on the called party's current location.

SUMMARY OF THE INVENTION

The present invention provides an apparatus and method for managing a mobile phone answering mode and outgoing message, or other type of indicator, based on the location of the mobile phone. The apparatus and method of the present invention makes use of a location system to ascertain the current location of a mobile telephone being carried by a user. Based on the current location, the present invention determines whether various operations of the mobile telephone to receive and/or send calls should be inhibited.

In addition, the present invention determines an appropriate outgoing message, or other type of indicator, to be provided to selected calling parties while the mobile telephone is located in an area where use of the mobile telephone to receive calls is prohibited. The particular outgoing message or indicator provided is customized to the current location of the mobile telephone. Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart outlining an exemplary operation of the present invention.

DETAILED DESCRIPTION OF THE PREFERRED EMBODIMENT

The present invention provides an apparatus and method for managing a mobile phone answering mode and outgoing message, or other type of indicator, based on the location of the mobile phone. While the principle preferred embodiment is directed to a mobile telephone, the present invention is not limited to such. Rather, the present invention is applicable to any mobile or stationary device whose operation may be restricted based on a location of the device. Such devices may include mobile telephones, cellular telephones, personal digital assistants (PDAs), pagers, computers, portable computers, portable communication devices, wireless stationary telephones, and the like.

The present invention is particular advantages when the communication device is a mobile communication device, however, the present invention may also be applied to stationary devices. The preferred embodiments of the present invention will be described in terms of a cellular telephone network only for illustrative purposes. The use of a cellular telephone in the following description is not intended to place any limitations on the present invention with regard to the type of communication device or communication network in which the present invention may be implemented.

Figure 1:
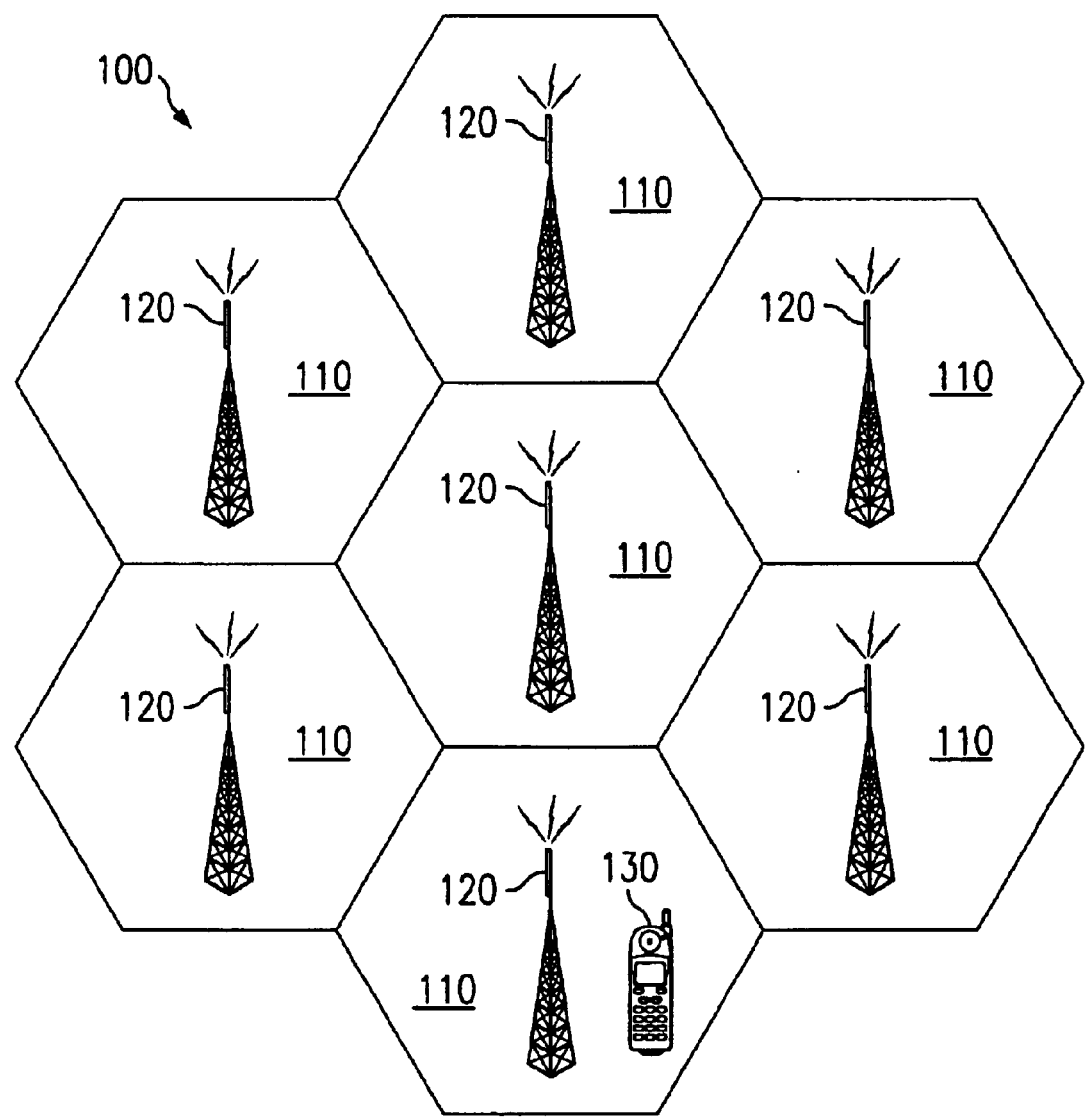
FIG. 1 is an exemplary block diagram illustrating a mobile telephone network according to the present invention.

Referring now to FIG. 1, a cellular telephone network is illustrated in accordance with the present invention. As shown in FIG. 1, cellular telephone network 100 is comprised of a plurality of cells 110 and base stations 120. Each cell 110 in the cellular telephone network 100 includes a base station 120 with which cellular devices in the cell communicate.

When a cellular telephone 130 is present in the cellular network 100 and is made active, such as by powering on the cellular telephone, the cellular telephone 130 performs a handshake operation with a base station 120 corresponding to the cell in which the cellular telephone 130 is present. The handshake operation informs the base station 120 of the identity of the cellular telephone 130 and allows the base station 120 to assign a frequency on which the cellular telephone 130 is to communicate, in a manner generally known in the art. In addition, the handshake operation allows for the initialization of billing account management and other functions performed by the base station 120.

In addition to the cellular telephone network 100, the present invention makes use of a location system present in the cellular telephone 130 to identify the current geographical location of the cellular telephone 130. The cellular telephone 130 periodically updates its current location information by making use of the location system to identify its current position. The location system may take the form of any appropriate location system including a Global Positioning System (GPS), mobile telephone system triangulation, and the like.

The cellular telephone 130 may report its current location to the base station 120 associated with the cell 110 in which the cellular telephone 130 is located. The current location of the cellular telephone 130 is then stored by the base station 120 in a data structure associated with an identifier for the cellular telephone, such as a mobile identification number (MIN), electronic serial number (ESN), or the like. This location information is updated each time the cellular telephone 130 transmits a new current location to the base station 120. If the cellular telephone 130 travels outside the cell areas supported by the base station 120, the data structure may be removed or may be updated with projected analytical data based on the projected movement.

The cellular telephone 130 may update this current location information on a periodic or continuous basis. In a preferred embodiment, the cellular telephone 130 uses a global positioning system (GPS) to determine its current location on a periodic basis and reports this location to the base station 120. A periodic update of the current location is preferred because it reduces the amount of data that is being transmitted to and processed by the base station 120.

When a call is routed to the base station 120 associated with the cell 110 in which the cellular telephone 130 is present, the base station 120 retrieves the current location of the cellular telephone 130 that was last reported to the base station 120. The routing of calls through a cellular network is well known in the art and thus, a detailed description of the routing is not provided here.

After retrieving the current location of the cellular telephone 130, the base station 120 compares the current location to a geographical database that identifies geographical locations and cellular telephone restrictions for these various geographical locations. For example, the geographical database may identify theatres, restaurants, churches, hospitals, and the like, in which cellular telephone use is restricted or prohibited.

Based on the comparison of the current location to the geographical database, the present invention is able to determine if the cellular telephone is in a geographical location where cellular telephone usage is restricted or prohibited and what the restrictions or prohibitions are. The determination of what restrictions or prohibitions are present at a particular geographical location is based on the restriction information stored in the geographical database in association with the geographical location.

The restrictions are established by the owners and/or operators of the facilities at the various geographical locations. Such owners and operators of these facilities may subscribe to the automatic ring mode and outgoing message management service offered by the present invention. In subscribing to the present invention, the owner/operator provides various information about the facility and the owner/operator's preferences with regard to the services provided, to the mechanism of the present invention.

The base station 120 may store geographical locations and associated restriction policy information for the various subscribers in the geographical area handled by the base station 120, in a database associated with the base station 120. Alternatively, the geographical location information and restriction policy information may be stored in a centralized database and information for the geographical locations may be retrieved from this centralized database for use with the present invention.

For example, a theatre owner may register with the cellular network 100, provide its geographical location and the restrictions that the theatre owner wishes to enforce in his/her establishment. Such restrictions may be, for example, cellular telephone usage is completely prohibited while within the theatre, i.e. cellular telephone calls cannot be received or sent using a cellular telephone within the geographical location of the theatre. Such restrictions may alternatively be that cellular usage is limited to vibration ring notification of an incoming call. Other restrictions may include restricting all incoming calls except those identified to be emergency calls, allowing calls to be received with vibration ring notification but not allow the cellular telephone to transmit control information, voice or voice signals back to the base station, allowing incoming text messages or mail without audio enable/disable, allowing certain uses of the cellular telephone in particular areas of the premises but not in other areas of the premises (such as a lobby versus a theatre), and the like.

In the case where incoming calls to a cellular telephone are blocked by the restrictions set by the owner/operator of the establishment, the call may be automatically handled by the base station to thereby notify the calling party of the called party's inability to receive the call using a prerecorded or customized message and optionally to record a message for the called party. In addition, the called party's cellular telephone may be equipped with a vibration ring notification, different from a standard vibration ring notification that identifies an incoming call, to indicate to the called party that a call was received and handled by the base station due to the called party being in a location that does not permit receipt of cellular telephone calls.

As noted above, based on the restrictions for the location in which the cellular telephone is currently located, the base station may return a prerecorded message to the calling party indicating that the called party is unavailable. Such messages may be of various types depending on the particular location in which the cellular telephone is located and the preferences of the owner/operator of the establishment at that location, the status and preferences of the called party, the identity of the calling party (as obtained from a caller-id device, for example), and possibly the geographical location of the calling party (as obtained from an area code of the calling party's telephone number, for example). The type of message that is provided to the calling party is designated in the data structure identifying the geographical location and cellular telephone restrictions.

In one embodiment of the present invention, the called party may establish a caller-id database indicating which types of outgoing messages or indicators are to be provided to calling parties based on the calling party's identity. For example, the called party may wish a first outgoing message or indicator to be provided to a calling party that is a personal friend of the called party and a second outgoing message or indicator to be provided to calling parties that are business associates or co-workers. While the present invention may use different indicators with various calling parties, the principle embodiments of the present invention are described in terms of providing outgoing messages based on the identity of the calling parties for illustration purposes.

The present invention may lookup the identity of a calling party, as determined using a caller-id apparatus, in the called party's caller-id database. From this lookup, the present invention may determine which outgoing message is preferred by the called party and that message may be provided to the calling party when the called party is not able to receive the call due to location restrictions.

Of course, the outgoing message provided to the calling party may also be based on the particular location and restrictions imposed by the location of the called party. For example, if the cellular telephone is in a hospital where cellular telephone usage is prohibited, the calling party may be provided with a message indicating that the called party is in a location where cellular telephone usage is prohibited. If the cellular telephone is located in a theatre where cellular telephone usage is generally prohibited with the exception of emergency calls, the prerecorded message may be of the type that informs the calling party that the called party is in a location where cellular telephone usage is prohibited but that if the call is an emergency, the calling party may press "*" and the call will be sent through to the called party's cellular telephone.

In addition, the owner or operator of the establishment may provide a contact telephone number to the cellular network that may be used in emergencies for contacting individuals who are present in the establishment. For example, if a calling party attempts to contact another party's cellular telephone while he is in an establishment that does not permit cellular telephone use, the base station may return a prerecorded message that indicates that the called party is in a location that does not permit him/her to receive cellular telephone calls but that if the call is an emergency, the calling party may reach the called party at an alternative telephone number as set for or provided by the establishment.

In still a further embodiment, the present invention may provide a prerecorded message that indicates the actual location of the called party. For example, if the called party is present in Baylor Richardson Hospital, the called party may be provided with a prerecorded message that states that the calling party is currently in Baylor Richardson Hospital and cannot be reached by his/her cellular telephone. If the call is an emergency, the calling party may reach the called party by calling the alternate telephone number for Baylor Richardson Hospital. A menu system may also may be provided for giving other contact options to the caller (like voicemail).

In yet another embodiment of the present invention, if the call cannot be received by the called party due to the restrictions imposed by the called party's current location, if the call is an emergency call, the call may be redirected to another telephone number by which the called party may be reached. Using the previous example, the called party may be provided with a prerecorded message that states that the calling party is currently in Baylor Richardson Hospital and cannot be reached by his/her cellular telephone. If the call is an emergency, the calling party may press "*" to be automatically connected to Baylor Richardson Hospital. Such an embodiment assumes that the owner/operator of the establishment provides the cellular telephone network with a contact telephone number to which the call may be redirected.

As previously mentioned, the particular message that is provided to the calling party may be determined based on the particular location in which the cellular telephone is located and the preferences of the owner/operator of the establishment at that location, the status and preferences of the called party, the identity of the calling party, and possibly the geographical location of the calling party. The location and owner/operator preferences information may be obtained from the geographical location database previously mentioned above. The called party preferences and status may be obtained from a called party database in which information about the called party is stored including the status of the called party, i.e. a preferred customer or non-preferred customer, preferences for messages to be provided to calling parties, and the like. The identity and geographical location information of the calling party may be obtained from a caller-id functionality in the base station.

Whether to provide an indication of the called party's location, whether to forward the call to another telephone number associated with the called party, and the like, may be determined based on personal preferences of the called party as set forth in a called party database associated with the cellular network. Likewise, whether to provide an outgoing message, whether to provide a current location of the called party, whether to allow emergency override options to a calling party, in what language to provide the prerecorded messages, and the like, may be determined based on the identity of the calling party and the location of the calling party as determined from caller-id information.

The particular message to be provided to the calling party may be determined based on the geographical location and preferences of the owner/operator in order to determine whether to announce the called party's location, what location to announce to the calling party, whether to provide an emergency override option to the calling party, whether to offer an alternative telephone number to the calling party, what the alternative telephone number is, whether to provide automatic forwarding of the call to a telephone number associated with the called party's current location, and the like.

As an example of the operation of the present invention, assume that a cellular telephone user goes to a theatre that subscribes to the service of the present invention. The theatre owner has provided the geographical location of the theatre and the restriction information that the theatre owner wishes to enforce. For example, the theatre owner indicates that he does not wish cellular telephones to be used to receive or send calls while within the theatre. However, if a call is an emergency call, the theatre owner wishes the call to be forwarded to a landline telephone number associated with the theatre. Moreover, the theatre owner has stated that outgoing messages to calling parties may include the name of the theatre and the alternate telephone number to which calls may be forwarded.

In a further embodiment, the message provided to the calling party may include a menu of options that may be selected by the calling party to perform various functions. The selection of the menu options may be performed using the keypad of the calling party's telephone unit, as is generally known in the art. The particular menu options provided is dependent on the particular implementation of the present invention. However, in the present example, the theatre owner may establish a menu of options for listing movies currently showing, show times, special sales currently going on at the establishment, and the like.

In addition to the subscription from the theatre owner, the cellular network has obtained information from the user of the cellular telephone indicating the user's preferences for outgoing messages. Such preferences may be obtained from the user, for example, when the user first subscribes to cellular telephone usage or the like. In the present example, it is assumed that the user does not wish his current location to be broadcast in an outgoing message to calling parties.

Thus, the preferences of the theatre owner and the preferences of the user conflict to a certain degree in that the user does not wish his location provided in the outgoing message and the theatre owner has indicated that the theatre name may be provided in the outgoing message. In such a case, the preferences of the user will override the preference of the theatre owner. If the conflict were reversed, the preferences of the theatre owner to not provide the theatre name will override the preferences of the user. Thus, the more restrictive preference will generally override the less restrictive preference.

The cellular telephone of the user periodically determines its current location using a location determination system, such as GPS, mobile phone triangulation, or the like. The cellular telephone reports this current location to the cellular network, and particularly to the base station associated with the cell in which the cellular telephone is current located. The base station stores this information in a database in association with an identifier for the cellular telephone. In addition, the base station retrieves the personal preferences of the user of the cellular telephone from a subscriber database associated with the cellular network.

When a call is received by the base station destined for the cellular telephone, the base station identifies the called party from header information in the call signals received. Based on this called party identification, the base station retrieves the current location, i.e. the last reported current location, of the cellular telephone. Based on this current location, the base station performs a comparison with its geographical database to determine if the cellular telephone is in the same location as a subscriber facility that has restricted cellular telephone usage. If so, the restricted cellular telephone usage information is retrieved for the geographical location. Otherwise, the call is routed to the called party's cellular telephone.

If a restricted cellular telephone policy applies, the base station correlates the restricted cellular telephone policy with the preferences of the user and applies the combination to the received call. In the present example, since the theatre prohibits cellular telephone usage, and the called party has indicate that he does not wish his current location to be broadcast, the base station will send a signal to the cellular telephone that deactivates the cellular telephone's audible ringer and enables a vibration notification. In addition, the calling party's caller id information may be provided to the cellular telephone for display.

In addition, the base station sends an outgoing message to the calling party indicating that the called party is unavailable to receive the call but does not provide the called party's current location. The outgoing message may further include an option, if the call is an emergency, to reroute the call to another telephone number where the called party may be reached. If the calling party elects to use this option, the call is rerouted to the designated emergency telephone number.

In addition to the above, if the called party is in a first country having a first native language, and the calling party is in a second country having a second native language, it would be inconvenient to present the prerecorded outgoing messages in the first language when the calling party most likely speaks the second language. With the mechanism of the present invention, based on caller id information, such as the area code or country code of the telephone number, a language of the prerecorded message may be identified so that an outgoing message in an appropriate language may be selected and provided to the calling party. Thus, for example, if the calling party is in Mexico and the called party is in the United States, rather than providing the outgoing message in English, the outgoing message will be provided in Spanish based on the country or area code of the calling party's telephone number. Alternatively, the outgoing message may include a menu of options, selectable by the calling party, for the particular language to use with the outgoing message.

Figure 2:
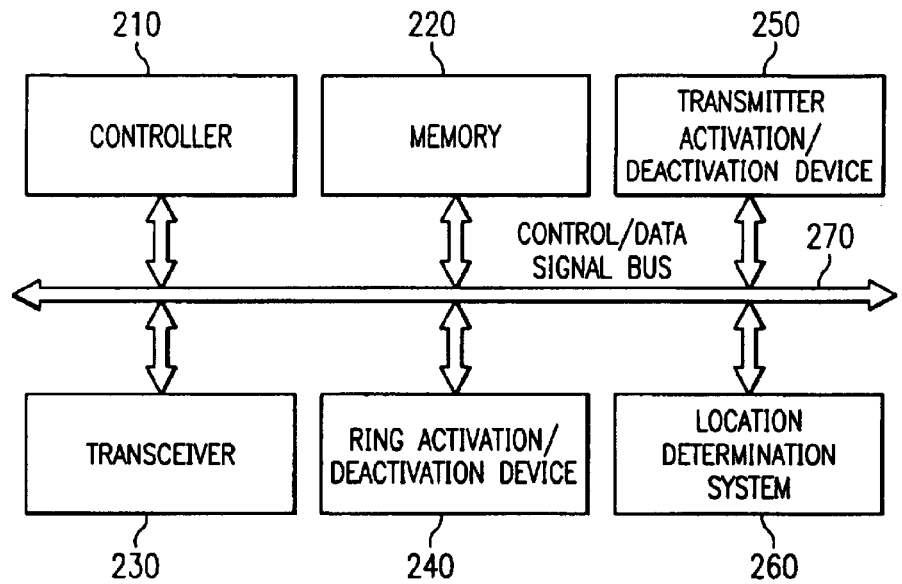
FIG. 2 is an exemplary diagram illustrating the primary operational components of a mobile telephone in accordance with the present invention.

FIG. 2 is an exemplary block diagram illustrating the primary operational components of the cellular telephone in accordance with the present invention. The elements shown in FIG. 2 may be implemented in hardware, software, or a combination of hardware and software. For example, many elements may be implemented as software executed by a processor.

As shown in FIG. 2, the cellular telephone 200 includes a controller 210, a memory 220, a transceiver 230, a ring activation/deactivation device 240, a transmitter activation/deactivation device 250, and a location determination system 260. These elements 210–260 are coupled to one another by control/data signal bus 270. Although a bus architecture is shown in FIG. 2, the present invention is not limited to such and any architecture that facilitates the communication of control/data signals between the elements 210–260 may be used without departing from the spirit and scope of the present invention. The keypad, microphone speaker and other standard parts of the cellular telephone are not shown in this diagram for simplicity.

The controller 210 controls the overall operation of the cellular telephone 200 and orchestrates the operation of the other elements 220–260. The memory 220 stores control programs and other information necessary for the operation of the cellular telephone 200. The controller 210 operates under the control programs stored in the memory 220.

The transceiver 230 is used for sending and receiving cellular telephone calls as well as control data for performing handshake operations with base stations, and the like. In addition, the transceiver 230 is used to report current location information obtained from the location determination system 260, to the base station.

The ring activation/deactivation device 240 activates the ringer on the cellular telephone such that the telephone provides an audible ring output, such as a musical chime, indicating the receipt of a telephone call. Alternatively, the ring activation/deactivation device 240 deactivates the audible ring when instructed to by way of input from the user or when instructed by messages received from a base station.

In addition, the ring activation/deactivation device 240 may activate vibration notification for notifying the user of an incoming call by vibrating the cellular telephone. Such vibration notification may include a first vibration notification for incoming calls when the user has selected to deactivate the audible ringer and a second vibration notification for incoming calls that are automatically handled by the base station due to the deactivation of the audible ringer based on the current location of the cellular telephone 200. Moreover, there may be a different vibration notification provided for emergency telephone calls. The deactivation of the audible ring notification and the activation of the vibration notification may be performed based on header information of signals received from the base station, for example.

The transmitter activation/deactivation device 250 activates the transmission functionality of the transmitter 230 when power is supplied to the cellular telephone 200 and when the cellular telephone 200 is located in an area where transmission of telephone calls by the cellular telephone 200 is permitted.

Alternatively, the transmitter activation/deactivation device 250 deactivates the transmission functionality of the cellular telephone 200 when the cellular telephone 200 is in an area where transmission of telephone calls from the cellular telephone 200 is prohibited. The deactivation of the transmission functionality may be based on header information of signals received from the base station via the transceiver 230, for example.

The location determination system 260 determines a current location of the cellular telephone 200 and provides this information to transceiver 230 for reporting to the base station. The location determination system 260 may operate on a continuous or periodic basis. The location determination system 260 may include a GPS, a mobile telephone triangulation system, or the like. The location reported by the location determination system 260 is used by the base station to determine if the cellular telephone 200 is present in a geographical location where restricted cellular telephone usage is indicated.

Figure 3:
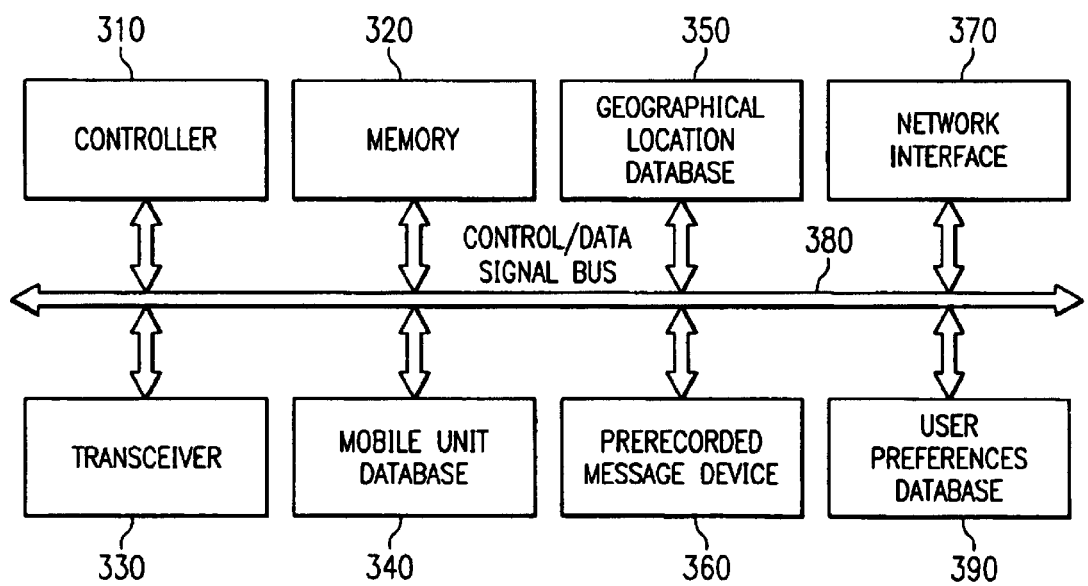
FIG. 3 is an exemplary diagram illustrating the primary operational components of a base station control system in accordance with the present invention.

FIG. 3 is an exemplary block diagram illustrating the primary operational components of a base station control system in accordance with the present invention. The elements shown in FIG. 3 may be implemented in hardware, software, or a combination of hardware and software. For example, many elements may be implemented as software executed by a processor.

As shown in FIG. 3, the base station control system 300 includes a control system 310, a memory 320, a transceiver 330, a cellular telephone unit database 340, a geographical location database 350, a prerecorded message device 360, a network interface 370, and a user preferences database 390. The elements 310–390 are coupled to one another via the control/data signal bus 380. Although a bus architecture is shown in FIG. 3, the present invention is not limited to such and any architecture that facilitates the communication of control/data signals between the elements 310–390 may be used without departing from the spirit and scope of the present invention.

The control system 310 controls the overall operation of the base station controller 300 and orchestrates the operation of the other elements 320–390. The controller 310 operates based on control programs stored in the memory 320. The memory 320 may also store other information used by the base station control system.

The transceiver 330 is used to send and receive calls, control signals, and data to and from cellular telephones located within the cell served by the base station. The mobile unit database 340 stores information regarding the cellular telephones located within the cells serviced by the base station, their identification, such as a MIN, and user preference information retrieved for the users of the cellular telephones in the cell serviced by the base station. The mobile unit database 340 also stores the current location information reported by the various cellular telephones located in the cells serviced by the base station.

The geographical location database 350 stores geographical location information for subscribers to the services of the present invention. For example, the geographical location database 350 stores geographical locations of subscribers, preferences of the owners/operators of facilities at these geographical locations regarding cellular telephone usage, and preferences of the owners/operators of the facilities regarding information included in outgoing messages to calling parties. The geographical location database 350 may further include information regarding forwarding numbers to which emergency calls may be transferred, for example.

The prerecorded message device 360 stores one or more prerecorded messages in one or more languages that may be provided as outgoing messages to calling parties when calls are unable to be completed to the called party. The prerecorded message device 360 may provide these messages to the calling party via the transceiver 330 based on the preferences of the user of the cellular telephone as obtained from the user preferences database 390 and the preferences of the owner/operator of the facilities at the cellular telephone's current location as obtained from the geographical location database 350.

The network interface 370 provides a communication interface between the base station control system 300 and the cellular and/or land line telephone network. Calls to cellular telephones within the cell serviced by the base station may be routed to the base station control system 300 via the network interface 370.

With the present invention, when a call is received by the base station control system 300 via the network interface 370, for example, the controller 310 receives the header information in the call signals and forwards this information to the mobile unit database 340. The mobile unit database 340 retrieves the entry for the called party and determines the last current location reported to the base station control system 300. This last current location is then forwarded to the geographical location database 350. In addition, the preferences of the called party are retrieved from the user preferences database 390 and temporarily stored in memory 320 for use by the controller 310.

The geographical location database 350 receives the last current location of the called party and correlates that geographical location with information stored in the geographic location database 350. If the called party is located in a non-restricted geographic area, the geographical location database 350 reports to the controller 310 that the call should be allowed to go through in a normal fashion. If the called party is located in a restricted geographic area, the geographical location database 350 retrieves the restriction policies and location preferences and stores them temporarily in memory 320 for use by the controller 310.

The controller 310 then uses the information retrieved from the mobile unit database 340 and the geographical location database 350 to process the received call. This may include instructing the prerecorded message device 360 to provide a prerecorded message to the calling party in accordance with the preferences indicated by the owner/operator of the facilities at the called party's current location and/or the preferences of the called party.

In addition, a caller-id functionality may be provided in controller 310 to thereby identify the approximate geographical location of the calling party and use this information for selection of a language for the prerecorded messages provided by the prerecorded message device 360.

It should be noted that there may be times when communication between the cellular telephone and the base station is interrupted. During such times, the present invention may operate as normal and assume that the cellular telephone is located in the last reported location. Alternatively, if communication is interrupted, the present invention may disable the operations of the present invention until communication is re-established. In such a case, calls will not be completed to the called party due to the lack of a communication connection, however the present invention will not operate either and thus, the calling party will not be provided with an erroneous outgoing message.

FIG. 4 is a flowchart outlining an exemplary operation of the present invention. As shown in FIG. 4, the operation starts with the calling party placing a call to the user of a mobile telephone (step 410). The mobile service provider identifies the called party and a corresponding current location of the called party as well as called party preferences are retrieved (step 420). The called party current location is then compared to geographical information in a geographical location database (step 430).

A determination is made as to whether there are any restrictions on the usage of mobile telephones in the called party's current location (step 440). If not, the call is handled in a normal fashion (step 450) and the operation of the present invention ends. If there are restrictions, the restriction policies are retrieved along with facility preferences for the called party's current location (step 460). The call is then handled by applying the restriction policies, called party preferences, and the facility preferences to the call (step 470). This may result in an outgoing message being provided to a calling party. The language of the outgoing message may be selected based on the approximate geographical location of the calling party as determined from caller id information, for example.

Thus, the present invention provides an apparatus and method by which the answering mode of a mobile telephone may be automatically modified based on the restrictions imposed by an owner/operator of facilities at the mobile telephone's current location. In addition, the outgoing message that is provided to the calling party may be automatically selected based on the preferences of the called party, the preferences of the owner/operator of the facilities, and caller id information obtained for the calling party.

While the present invention has been described in terms of changing the answering mode and outgoing message based on the current location of the mobile telephone, these are not the only attributes of the mobile telephone that may be modified using the present invention. For example, in addition to, or in replacement of, these attributes, other attributes including display contrast, backlighting, volume control, noise filtering and the like may be modified based on the current location of the mobile telephone. For example, if it is determined that the mobile telephone is located in a noisy restaurant, the present invention may provide functionality wherein the mobile telephone is instructed to increase noise filtering and increase the speaker volume on the mobile telephone.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing operation of a portable device, comprising:

determining a geographical location of the portable device, in response to receiving a communication destined for the portable device;

determining if the geographical location of the portable device is within a geographical area of restricted use of the portable device;

restricting use of the portable device based on the determination of whether the geographical location of the portable device is within a geographical area of restricted use; and sending an outgoing message to a source of the communication if use of the portable device is restricted, wherein the outgoing message includes content automatically determined based on the geographical location of the portable device, first preferences of a user of the portable device and second preferences of an owner/operator of an establishment at the geographical location of the portable device.

2. The method of claim 1, wherein determining if the geographical location of the portable device is within a geographical area of restricted use includes:

looking up the geographical location of the portable device in a geographical information database; and retrieving restriction information associated with the geographical location of the portable device.

3. The method of claim 2, wherein the restriction information includes at least one of completely prohibiting use of the portable device, vibration call notification only, restricting all incoming calls except emergency calls, allowing incoming text messages only, allowing use of the portable device in certain areas of the geographical location, prohibiting transmission of control information from the portable device, and prohibiting voice transmission from the portable device.

4. The method of claim 1, wherein the portable device is one of a mobile telephone, a cellular telephone, a personal digital assistant, a pager, a portable computer, and a portable communication device.

5. The method of claim 1, wherein determining a geographical location of the portable device includes using a Global Positioning System associated with the portable device to determine a geographical location of the portable device.

6. The method of claim 1, wherein determining a geographical location of the portable device includes receiving the geographical location from a geographical location determination device associated with the portable device.

7. The method of claim 1, wherein a language of the outgoing message is selected based on a geographic location of the source of the communication.

8. The method of claim 1, wherein the outgoing message includes a menu of selectable options.

9. The method of claim 1, further comprising:
not restricting use of the portable device if the call is indicated to be an emergency call.

10. The method of claim 1, further comprising:
redirecting the call to an alternative device if use of the portable device is restricted.

11. The method of claim 1, wherein if the first preferences of the user of the portable device and the second preferences of the owner/operator of the establishment at the geographical location of the portable device conflict, a combination of more restrictive preferences from the first preferences of the user and the second preferences of the owner/operator is used to determine the outgoing message.

12. The method of claim 1, wherein the outgoing message includes an identity of the establishment if the first preferences of the user permit the identity of the establishment to be included in the outgoing message.

13. The method of claim 1, wherein the outgoing message includes an emergency contact number for a communication device associated with the establishment if the second preferences of the owner/operator of the establishment includes an emergency contact number for a communication device associated with the establishment.

14. The method of claim 13, further comprising:
redirecting the communication to the communication device associated with the establishment and associated with the emergency contact number if the call is indicated to be an emergency call.

15. An apparatus for managing operation of a portable device, comprising:
a controller;
a portable unit database coupled to the controller; and
a geographical database coupled to the controller, wherein the controller retrieves a geographical location of the portable device from the portable unit database, in response to receiving a communication destined for the portable device, determines if the geographical location of the portable device is within a geographical area of restricted use of the portable device based on geographical information in the geographical database, restricts use of the portable device based on the determination of whether the geographical location of the portable device is within a geographical area of restricted use, and sends an outgoing message to a source of the communication if use of the portable device is restricted, wherein the outgoing message includes content automatically determined based on the geographical location of the portable device, first preferences of a user of the portable device and second preferences of an owner/operator of an establishment at the geographical location of the portable device.

16. The apparatus of claim 15, wherein the controller determines if the geographical location of the portable device is within a geographical area of restricted use by looking up the geographical location of the portable device in the geographical database, and retrieving restriction information associated with the geographical location of the portable device.

17. The apparatus of claim 16, wherein the restriction information includes at least one of completely prohibiting use of the portable device, vibration call notification only, restricting all incoming calls except emergency calls, allowing incoming text messages only, allowing use of the portable device in certain areas of the geographical location, prohibiting transmission of control information from the portable device, and prohibiting voice transmission from the portable device.

18. The apparatus of claim 15, wherein the portable device is one of a mobile telephone, a cellular telephone, a personal digit assistant, a pager, a portable computer, and a portable communication device.

19. The apparatus of claim 15, wherein the geographical location of the portable device is reported to the portable device database using a Global Positioning System associated with the portable device.

20. The apparatus of claim 15, wherein the geographical location of the portable device is reported to the portable device database by a geographical location determination device associated with the portable device.

21. The apparatus of claim 15, wherein a language of the outgoing message is selected based on a geographic location of the source of the communication.

22. The apparatus of claim 15, wherein the outgoing message includes a menu of selectable options.

23. The apparatus of claim 15, wherein the controller does not restrict use of the portable device if the call is indicated to be an emergency call.

24. The apparatus of claim 15, wherein the controller redirects the call to an alternative device if use of the portable device is restricted.

25. The apparatus of claim 15, wherein if the first preferences of the user of the portable device and the second preferences of the owner/operator of the establishment at the geographical location of the portable device conflict, the controller uses a combination of more restrictive preferences from the first preferences of the user and the second preferences of the owner/operator to determine the outgoing message.

26. The apparatus of claim 15, wherein the outgoing message includes an identity of the establishment if the first preferences of the user permit the identity of the establishment to be included in the outgoing message.

27. The apparatus of claim 15, wherein the outgoing message includes an emergency contact number for a communication device associated with the establishment if the second preferences of the owner/operator of the establishment includes an emergency contact number for a communication device associated with the establishment.

28. The apparatus of claim 27, wherein the controller redirects the communication to the communication device associated with the establishment and associated with the emergency contact number if the call is indicated to be an emergency call.

29. A computer program product in a computer readable medium for managing operation of a portable device, comprising:
first instructions for determining a geographical location of the portable device, in response to receiving a communication destined for the portable device;
second instructions for determining if the geographical location of the portable device is within a geographical area of restricted use of the portable device;
third instructions for restricting use of the portable device based on the determination of whether the geographical location of the portable device is within a geographical area of restricted use; and
fourth instructions for sending an outgoing message to a source of the communication if use of the portable device is restricted, wherein the outgoing message includes content automatically determined based on the geographical location of the portable device, first preferences of a user of the portable device and second preferences of an owner/operator of an establishment at the geographical location of the portable device.

30. The computer program product of claim 29, wherein the second instructions for determining if the geographical location of the portable device is within a geographical area of restricted use include:
  instructions for looking up the geographical location of the portable device in a geographical information database; and
  instructions for retrieving restriction information associated with the geographical location of the portable device.

31. The computer program product of claim 30, wherein the restriction information includes at least one of completely prohibiting use of the portable device, vibration call notification only, restricting all incoming calls except emergency calls, allowing incoming text messages only, allowing use of the portable device in certain areas of the geographical location, prohibiting transmission of control information from the portable device, and prohibiting voice transmission from the portable device.

32. The computer program product of claim 29, wherein the portable device is one of a mobile telephone, a cellular telephone, a personal digital assistant, a pager, a portable computer, and a portable communication device.

33. The computer program product of claim 29, wherein the first instructions for determining a geographical location of the portable device include instructions for using a Global Positioning System associated with the portable device to determine a geographical location of the portable device.

34. The computer program product of claim 29, wherein the first instructions for determining a geographical location of the portable device include instructions for receiving the geographical location from a geographical location determination device associated with the portable device.

35. The computer program product of claim 29, wherein a language of the outgoing message is selected based on a geographic location of the source of the communication.

36. The computer program product of claim 29, wherein the outgoing message includes a menu of selectable options.

37. The computer program product of claim 29, further comprising:
  fifth instructions for not restricting use of the portable device if the call is indicated to be an emergency call.

38. The computer program product of claim 29, further comprising:
  fifth instructions for redirecting the call to an alternative device if use of the portable device is restricted.

39. The computer program product of claim 29, wherein if the first preferences of the user of the portable device and the second preferences of the owner/operator of the establishment at the geographical location of the portable device conflict, a combination of more restrictive preferences from the first preferences of the user and the second preferences of the owner/operator is used to determine the outgoing message.

40. The computer program product of claim 29, wherein the outgoing message includes an identity of the establishment if the first preferences of the user permit the identity of the establishment to be included in the outgoing message.

41. The computer program product of claim 29, wherein the outgoing message includes an emergency contact number for a communication device associated with the establishment if the second preferences of the owner/operator of the establishment includes an emergency contact number for a communication device associated with the establishment.

42. The computer program product of claim 41, further comprising:
  fifth instructions for redirecting the communication to the communication device associated with the establishment and associated with the emergency contact number if the call is indicated to be an emergency call.

* * * * *